(12) United States Patent
Devi et al.

(10) Patent No.: US 9,565,116 B2
(45) Date of Patent: Feb. 7, 2017

(54) EXECUTING VARIABLE-PRIORITY JOBS USING MULTIPLE STATISTICAL THRESHOLDS IN CELLULAR NETWORKS

(71) Applicant: GLOBALFOUNDRIES INC., Grand Cayman (KY)

(72) Inventors: Umamaheswari C. Devi, Bangalore (IN); Ravindranath Kokku, Bangalore (IN); Vinay Kumar Kolar, Bangalore (IN); Mukundan Madhavan, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 674 days.

(21) Appl. No.: 14/013,645

(22) Filed: Aug. 29, 2013

(65) Prior Publication Data
US 2015/0063106 A1    Mar. 5, 2015

(51) Int. Cl.
| | | |
|---|---|---|
| *G06F 13/24* | (2006.01) | |
| *H04L 12/801* | (2013.01) | |
| *H04L 12/851* | (2013.01) | |
| *H04L 12/823* | (2013.01) | |
| *H04W 28/02* | (2009.01) | |
| *H04L 29/08* | (2006.01) | |

(52) U.S. Cl.
CPC .............. *H04L 47/19* (2013.01); *H04L 47/24* (2013.01); *H04L 47/32* (2013.01); *H04L 67/322* (2013.01); *H04W 28/02* (2013.01)

(58) Field of Classification Search
CPC ........ G06F 13/24; G06F 13/26; G06F 9/4818; G05B 2219/13086

USPC .................. 710/260–269, 240–244; 370/337
See application file for complete search history.

(56) References Cited

U.S. PATENT DOCUMENTS

| | | | |
|---|---|---|---|
| 5,878,351 A | 3/1999 | Alanara et al. | |
| 6,055,564 A * | 4/2000 | Phaal ................. | H04L 67/1002 709/207 |
| 7,181,485 B1 | 2/2007 | Lau et al. | |
| 7,444,383 B2 | 10/2008 | Horvitz | |
| 7,548,901 B2 | 6/2009 | Ashwin et al. | |

(Continued)

OTHER PUBLICATIONS

Donari, David R. et al., "Semantic Importance Dual-Priority Server: Properties," Internal Report, May 2007, 12 pages. PDF copy can be found at Real Time Systems Research Group—DIEC—UNS at http://www.ingelec.uns.edu.ar/rts/publications.htm.

(Continued)

*Primary Examiner* — Tim T Vo
*Assistant Examiner* — Kim T. Huynh
(74) *Attorney, Agent, or Firm* — Scully Scott Murphy and Presser; Frank Digiglio

(57) ABSTRACT

Methods and arrangements for managing variable-priority flows in a network. Requests for transmission of digital content are received from client devices, each request being associated with a priority, the requests including at least one lower-priority delayable request and at least one higher-priority request. A usable bandwidth for delivery of the requested digital content through the network is estimated and, within the estimated usable bandwidth, there is controlled at least one flow associated with the at least one lower-priority request in the presence of at least one flow for the at least one higher-priority request. Other variants and embodiments are broadly contemplated herein.

20 Claims, 9 Drawing Sheets

(56) References Cited

U.S. PATENT DOCUMENTS

| | | | |
|---|---|---|---|
| 8,339,990 B1* | 12/2012 | Tzamaloukas | H04W 48/18 370/254 |
| 2003/0074507 A1* | 4/2003 | Weber | G06F 9/4887 710/240 |
| 2006/0262719 A1 | 11/2006 | Cao et al. | |
| 2008/0153523 A1 | 6/2008 | Febonio et al. | |
| 2010/0011056 A1 | 1/2010 | Bryson et al. | |
| 2010/0198943 A1 | 8/2010 | Harrang et al. | |
| 2010/0202420 A1* | 8/2010 | Jersenius | H04L 47/10 370/337 |
| 2011/0119680 A1 | 5/2011 | Li et al. | |
| 2011/0295635 A1 | 12/2011 | Basak et al. | |
| 2012/0210055 A1* | 8/2012 | Mace | G06F 13/1626 711/105 |
| 2012/0263440 A1 | 10/2012 | Malin et al. | |

OTHER PUBLICATIONS

Microsoft Corporation, "[MS-BPDP]: Background Intelligent Transfer Service (BITS) Peer-Caching: Peer Discovery Protocol," Jul. 22, 2013, 35 pages, Microsoft Corporation, Redmond, Washington, USA.

Key, Peter et al., "Emulating Low-priority Transport at the Application Layer: A Background Transfer Service," SIGMETRICS/Performance '04, Jun. 12-16, 2004, New York, NY, USA, 12 pages, ACM Digital Library.

Venkataramani, Arun et al., "TCP Nice: A Mechanism for Background Transfers," Proceedings of the 5th Symposium on Operating Systems Design and Implementation, Boston, Massachusetts, USA, Dec. 9-11, 2002, 16 pages, USENIX Association at http://www.usenix.org.

\* cited by examiner

FIG. 4

```
1: Let c_i = C(D_i, K_i, Z_i, F_i) denote some cost function associated with each flow F_i.
2: Further, let P̄ = {P_1,...,P_N} denote the permutation that induces a descending order
   on the costs c_i.                                                              ⎫
3: for i = 1 to N do                                                              ⎬ 431
4:   Measure θ_i, the achievable throughput of flow F_{P_i}.                      ⎪
5:   if θ_i ≥ T then                                                              ⎪
6:     Set flow rate of F_{P_i} to its achievable throughput ("ON" state).        ⎪
7:   else                                                                         ⎪
8:     Set flow rate of F_{P_i} to some δ > 0. (Trickle or "OFF" State).          ⎪
9:   end if                                                                       ⎪
10:  end for                                                                      ⎭

{Ensuring that varying channel conditions are tracked.}                        ⎫
11: while Current time < Next scheduling slot. do                                 ⎬ 433
12:   if For each ON flow's throughput falls below T then                         ⎪
13:     Turn Flow OFF.                                                            ⎪
14:   end if                                                                      ⎪
15: end while                                                                     ⎭

{Adjusting T according to prevailing conditions at the end of the slot.}
16: Let j = max_{i=1,...,N} i : θ_{P_i} > δ and k = min_{i=1,...,N} i : θ_{P_i} = δ.

{If some flow got switched OFF and is urgent, you should bump T down by some
   amount(say,) T_step. If some flow got switched ON and is well under control, you can
   bump T up.}                                                                    ⎫
17: if (Z_{P_j} - K_{P_k})/(D_{P_k} - t) > θ_max then                             ⎪
18:   T = T - T_step.                                                             ⎬ 435
19: else if (Z_{P_j} - K_{P_j})/(D_{P_j} - t) < θ_min then                        ⎪
20:   T = T + T_step.                                                             ⎪
21: end if                                                                        ⎭
```

1: Let $c_i = C(f_i, h_i, z_i, P_i)$ denote some cost function associated with each flow $F_i$.
2: Further, let $\mathcal{P} = \{P_1, \ldots, P_N\}$ denote the permutation that induces a descending order on the costs $c_i$.
3: for i = 1 to N do
4:   Measure $\theta_i$, the achievable throughput of flow $F_{P_i}$.
5:   if $\theta_i > T$ then
6:     Set flow rate of $F_{P_i}$ to its achievable throughput ("ON" state).
7:   else
8:     Set flow rate of $F_{P_i}$ to some $\delta > 0$. (Trickle or "OFF" State).
9:   end if
10: end for
11: if No flows were switched ON then
12:   Pick R to be a pre-chosen parameter, and set a counter r = 0.
13:   for i = 1 to N do
14:     if $\theta_i \leq T_2$ and $r \leq R$ then
15:       Set flow rate of $F_{P_i}$ to its achievable throughput ("ON" state).
16:       Increment r.
17:     else
18:       Set flow rate of $F_{P_i}$ to some $\delta > 0$. (Trickle or "OFF" State).
19:     end if
20:   end for
21: end if
22: {Ensuring that varying channel conditions are tracked.}
23: while Current time < Next scheduling slot do
24:   if For each ON flow's throughput falls below $T$ then
25:     Turn Flow OFF.
26:   end if
27: end while
28: {Adjusting $T$ according to prevailing conditions at the end of the slot.}
29: Let $j = \max_{i=1,\ldots,N} i : \theta_{P_i} > \delta$ and $k = \min_{i=1,\ldots,N} i : \theta_{P_i} = \delta$.
30: {If some flow got switched OFF and is urgent, you should bump $T$ down by some amount (say,) $T_{step}$. If some flow got switched ON and is well under control, you can bump $T$ up.}
31: if $\left(\frac{Z_{P_k} - K_{P_k}}{D_{P_k}} - t\right) > \theta_{max}$ then
32:   $T = T - T_{step}$.
33: else if $\left(Z_{\theta_j} - \frac{K_{P_j}}{D_{P_j}} - t\right) < \theta_{min}$ then
34:   $T = T + T_{step}$.
35: end if

US 9,565,116 B2

EXECUTING VARIABLE-PRIORITY JOBS USING MULTIPLE STATISTICAL THRESHOLDS IN CELLULAR NETWORKS

BACKGROUND

The proliferation of smart mobile devices is leading to an unprecedented increase in mobile data traffic, but the distribution of traffic is not uniform over time. Networks often observe significant variation in utilization levels, mainly triggered by diurnal patterns of human activity; e.g., networks see more utilization during days than nights, cellular base-stations are more loaded during mornings and late evenings in residential areas, whereas base-stations near commercial areas are busy during office hours, etc. In fact, there is high variation in the throughput that a given traffic flow achieves even at short time scales of a few seconds.

Such variation in traffic causes traffic congestion (due to overload) at certain times of day and under-utilization at certain others. Overloaded conditions can adversely impact the quality-of-experience (QoE) of users, especially when streaming videos, and lower the effective yield of network resources. One way of alleviating the traffic congestion is to deliver traffic that users are not actively waiting for (that is, delay-tolerant traffic) during periods of lighter use. Doing so in an effective manner is not straightforward since load at a cellular base station fluctuates even at short time scales.

As such, delivery of digital content to mobile devices over a spectrum (such as 3G spectrum) carries costs for mobile network operators, over-the-top-providers, and end users. Mobile network operators provide bandwidth for delivery of data services. Cellular networks incur significant capital and operational costs, which are increasing significantly due to the rapidly growing demand. Also, cellular wireless spectrum is a scarce and increasingly expensive resource. Consequently, it is important for the operators to extract the maximum yield out of the spectrum owned. The yield of a network deployment is a function of the number of "useful" bytes delivered in time without deteriorating the QoE to users. One way of maximizing yield is to deliver delay-tolerant traffic (or flows) during times when the network has spare capacity. Such delivery will help improve QoE for real-time flows due to lower interference from competing flows. At the same time, spectrum that would otherwise remain unutilized can effectively be put to use.

BRIEF SUMMARY

In summary, one aspect of the invention provides a method of managing variable-priority flows in a network, the method comprising: utilizing at least one processor to execute computer code configured to perform the steps of: receiving requests for transmission of digital content from client devices, each request being associated with a priority, the requests including at least one lower-priority delayable request and at least one higher-priority request; and controlling at least one flow associated with the at least one lower-priority request in the presence of at least one flow for the at least one higher-priority request; the controlling comprising scheduling at least one lower-priority flow for throughput only if a current throughput of the at least one lower-priority flow is above a predetermined threshold.

Another aspect of the invention provides an apparatus comprising: at least one processor; and a computer readable storage medium having computer readable program code embodied therewith and executable by the at least one processor, the computer readable program code comprising: computer readable program code configured to receive requests for transmission of digital content from client devices, each request being associated with a priority, the requests including at least one lower-priority delayable request and at least one higher-priority request; and computer readable program code configured to control, at least one flow associated with the at least one lower-priority request in the presence of at least one flow for the at least one higher-priority request; wherein the controlling comprises scheduling at least one lower-priority flow for throughput only if a current throughput of the at least one lower-priority flow is above a predetermined threshold.

An additional aspect of the invention provides a computer program product comprising: a computer readable storage medium having computer readable program code embodied therewith, the computer readable program code comprising: computer readable program code configured to receive requests for transmission of digital content from client devices, each request being associated with a priority, the requests including at least one lower-priority delayable request and at least one higher-priority request; and computer readable program code configured to control, at least one flow associated with the at least one lower-priority request in the presence of at least one flow for the at least one higher-priority request; wherein the controlling comprises scheduling at least one lower-priority flow for throughput only if a current throughput of the at least one lower-priority flow is above a predetermined threshold.

A further aspect of the invention provides a method comprising: designating at least one lower-priority delay-tolerant flow in a cellular network; and controlling the at least one lower-priority delay-tolerant flow to restrict an effect on throughput of at least one higher-priority flow in the cellular network; the controlling comprising scheduling the at least one lower-priority delay-tolerant flow for transmission only if a current throughput of the at least one lower-priority delay-tolerant flow is above a threshold, the threshold being chosen based on a cumulative distribution of historical throughputs through the cellular network.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 sets forth a complete threshold-based interference method.

FIG. 6 sets forth a refinement of a threshold-based interference method.

DETAILED DESCRIPTION

Figure 1:
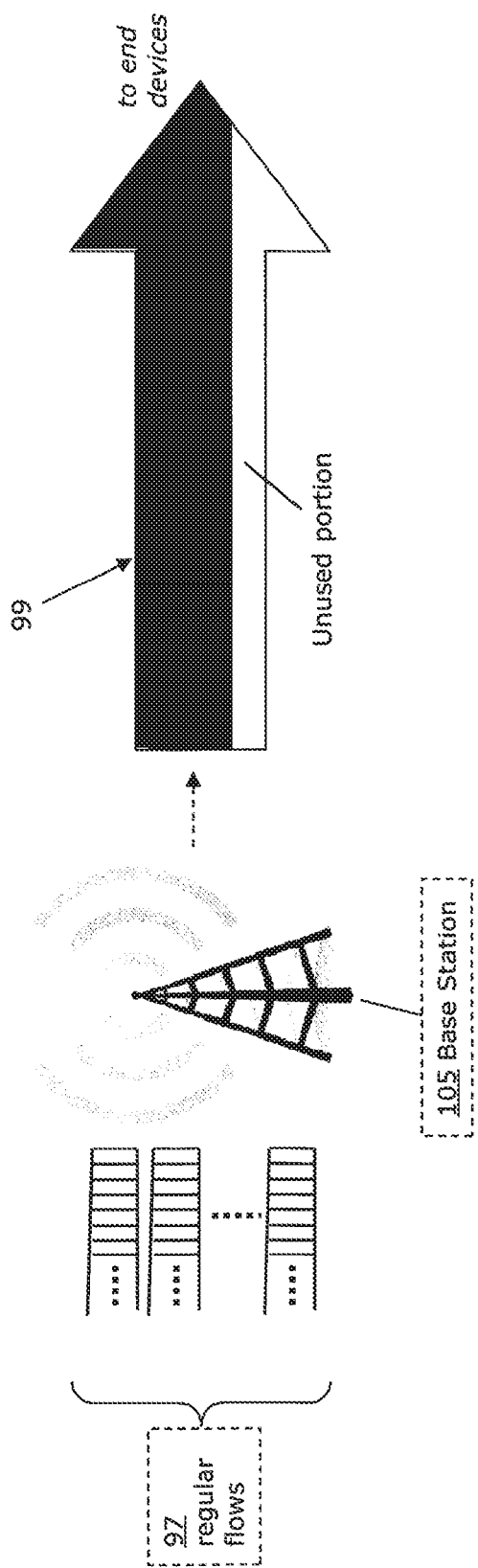
FIGS. 1 and 2 schematically illustrate components of a problem approached herein.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-7. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 9. In accordance with an example embodiment, most if not all of the process steps, components and outputs discussed with respect to FIGS. 1-7 can be performed or utilized by way of a processing unit or units and system memory such as those indicated, respectively, at 16' and 28' in FIG. 9, whether on a server computer, a client computer, a node computer in a distributed network, or any combination thereof.

Figure 7:
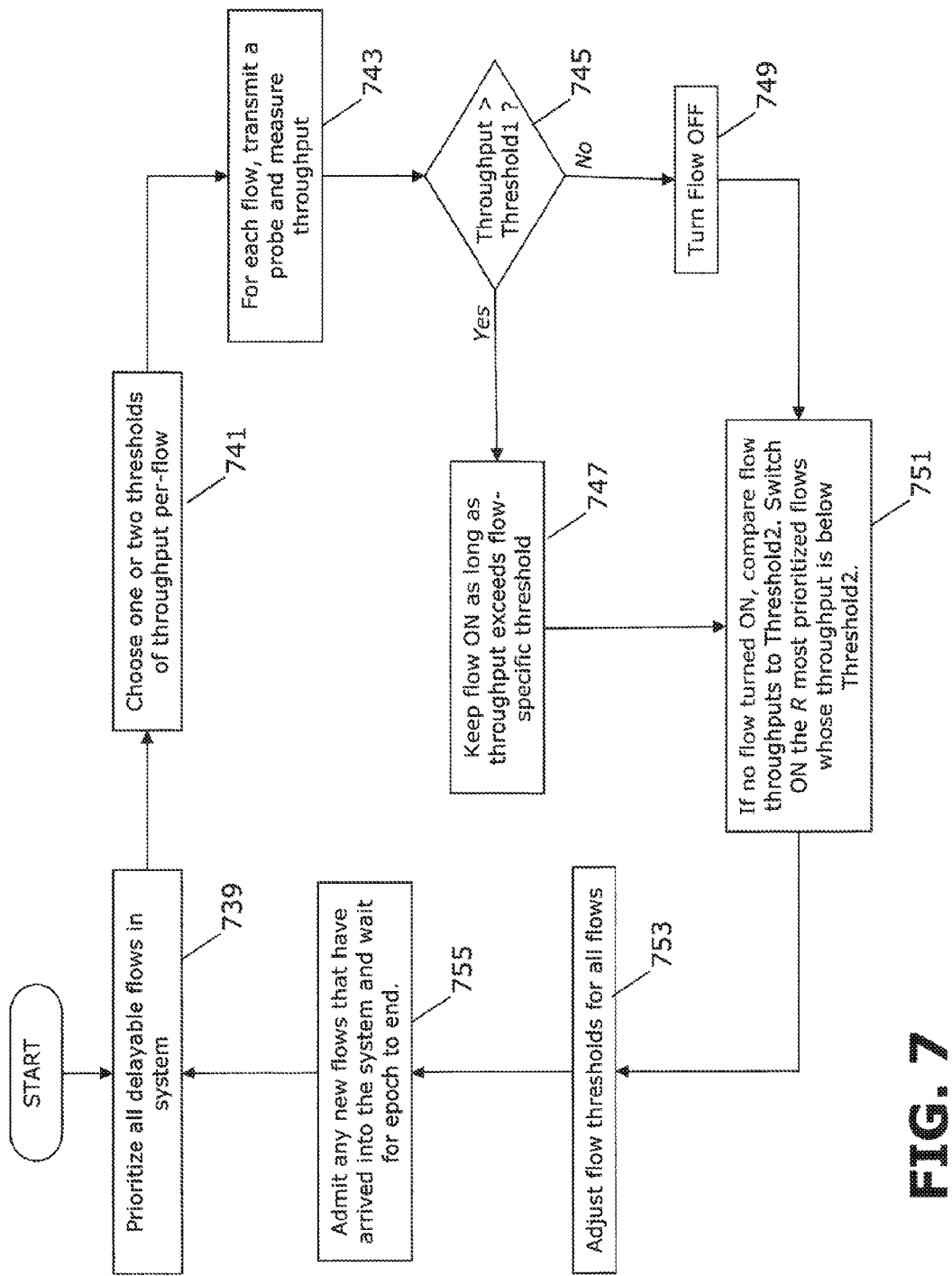
FIG. 7 schematically illustrates an overall system flow of the proposed flow manager.

To facilitate easier reference, in advancing from FIG. 1 to and through FIG. 7, a reference numeral is advanced by a multiple of 100 in indicating a substantially similar or analogous component or element with respect to at least one component or element found in at least one earlier figure among FIGS. 1-7.

In a context of at least one embodiment of the invention, systems and methods are employed for network-controlled delayed-delivery of data to users such that data are transferred opportunistically during periods of low spectrum demand. As such, it is recognized that during peak times of delivering digital content, bandwidth may be depleted in a way to cause unintended delays and thus decrease the user's quality of experience. Such delays also erode the user's quality of experience for over-the-top programming, thus eroding the user's confidence in the mobile network operator and the over-the-top-provider's services. Moreover, during off-peak demand times, bandwidth may go unused, and typically there is no way to recover the unused bandwidth for future use. Thus, the lost bandwidth decreases the potential profits of the mobile network provider. Generally, it has become readily apparent that conventional systems and methods have fallen short in providing a desirably efficient use of operator spectrum.

In a context of at least one embodiment of the invention, less-congested time periods are thus exploited for end-to-end services by way of increasing overall spectrum utilization and to meet superior QoE expectations. In this vein, systems and methods are employed for a network-controlled delayed delivery of delay-tolerant data to users such that delay-tolerant data are transferred during periods of low spectrum demand. Mobile device users can be offered an opportunity for delayed delivery times in order to spread out bandwidth usage on 3G networks. Users who request delivery of data objects such as videos may be given the option of accepting delayed delivery in exchange for lower prices of delivery.

Figure 2:
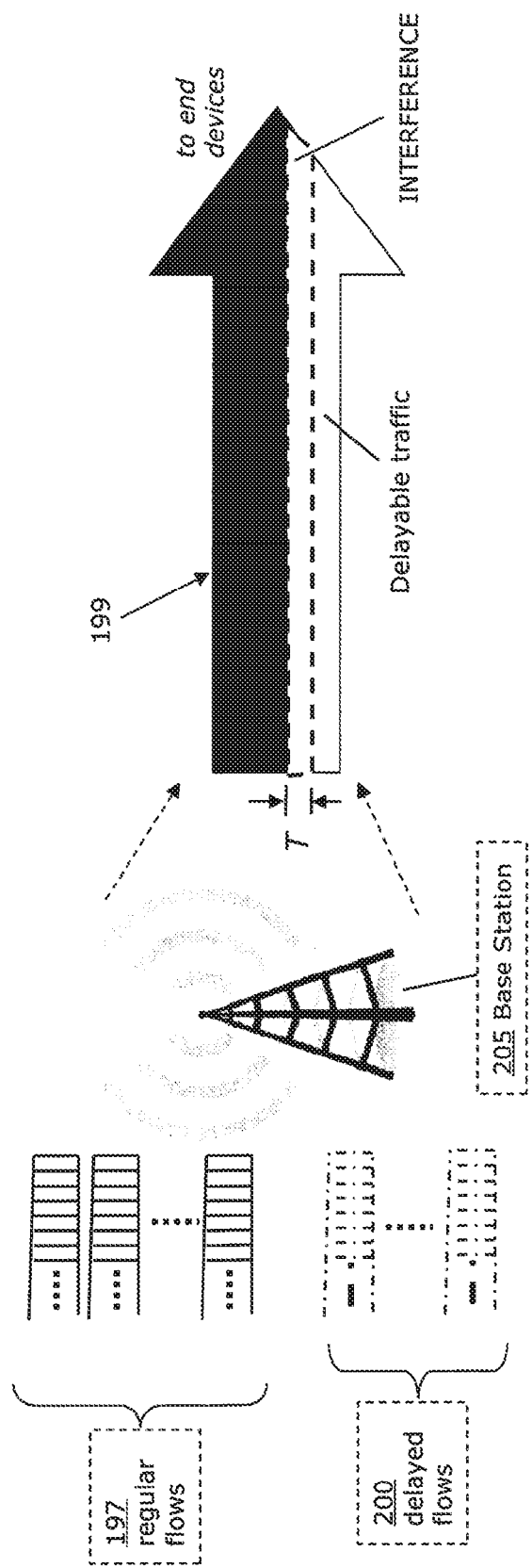

As such, FIGS. 1 and 2 schematically illustrate components of a problem approached in accordance with at least one embodiment of the invention. As shown in FIG. 1, at any given time, with regular digital content flows 97 processed via a base station 105, on-demand traffic (i.e., traffic for real-time or virtually immediate delivery of digital content) occupies a certain portion of the available spectrum (e.g., 3G spectrum) 99, with or without some portion unused. The broad goal of delayed delivery is to utilize this unused bandwidth to transmit as much of the delayed traffic as possible. As can be appreciated from FIG. 2, then, a challenge emerges in managing delayed-delivery flows 200, via accommodating delayable traffic within spectrum 199, such that the delayed data are delivered within reasonable pre-established (e.g., pre-agreed) deadlines while maintaining the interference caused on the on-demand traffic at a low value, e.g., less than some threshold T.

Generally, in a context of at least one embodiment of the invention, it is recognized that there are techniques for transferring background flows in a non-intrusive manner when all the links in an end-to-end path are scheduled under first-in-first out (FIFO). Generally, it is recognized that such conventional arrangements do not present background transfers with proportionally fair (PF) schedulers as typically employed by base stations in cellular networks.

Figure 3:
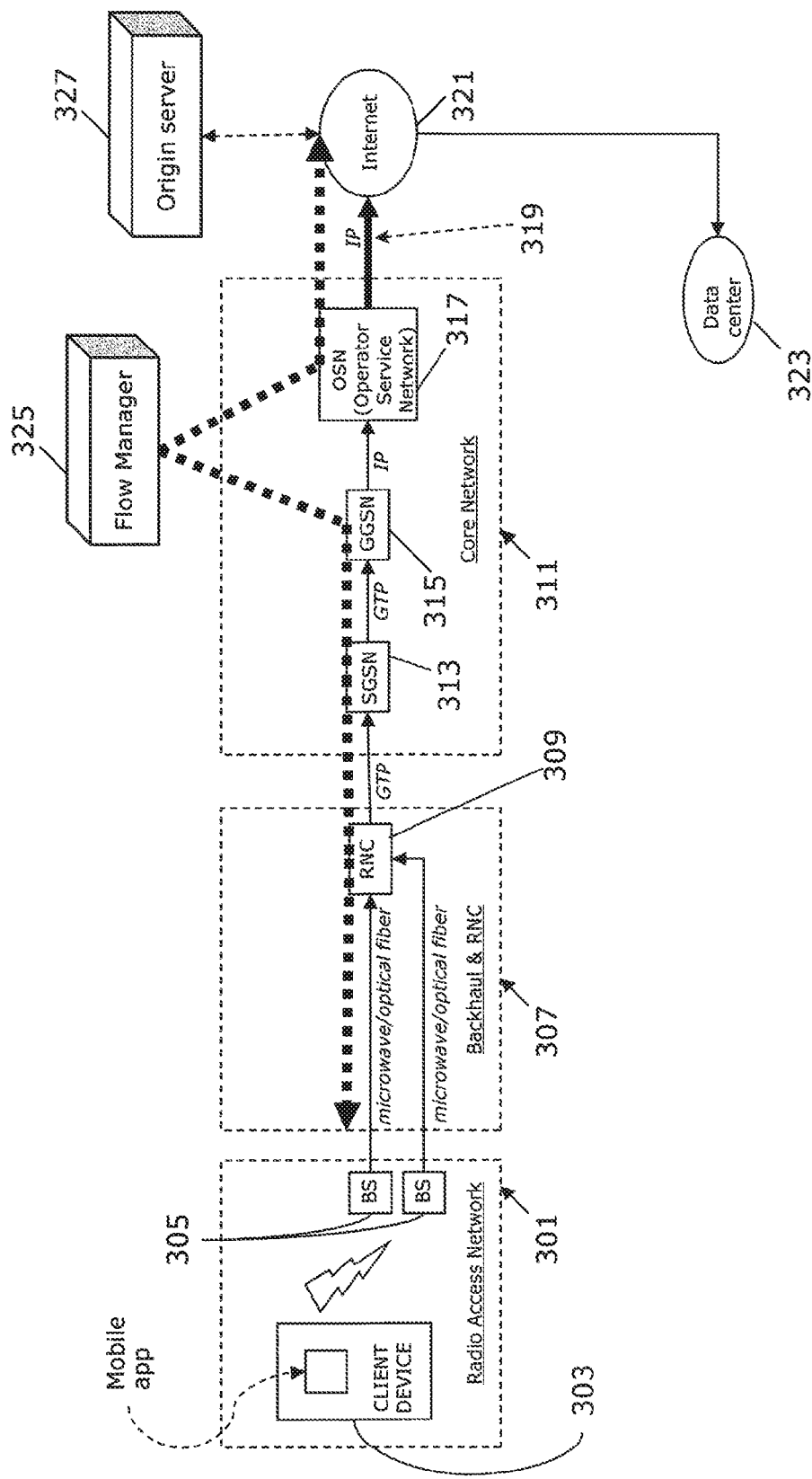
FIG. 3 schematically illustrates a context of a general system architecture.

Accordingly, FIG. 3 schematically illustrates a general system architecture, in accordance with a context of at least one embodiment of the invention, which can be used to facilitate delayed delivery in a context of base stations employing PF scheduling. As shown, in a radio access network 301, a client device (CD) 303, e.g., a mobile phone, is communicatively in contact with base stations (BS) 305. The base stations are connected to a backhaul and RNC (Radio Network Control) portion 307, wherein a link (such as a microwave and/or optical fiber link) connects each base station with the RNC 109. The RNC 109 is connected to an SGSN (Serving GPRS [General Packet Radio Service] Support Node) 313 of a core network 311 via a GTP (GPRS tunneling protocol) link. Also included in core network 311 are a GGSN (Gateway GPRS Support Node) 315 connected via a GTP to the SGSN 313, and also to an OSN (Operator Service Network) 317 via an IP (Internet Protocol) link. For its part, the OSN 317 is connected via an external link 319 to the Internet 321, itself in communicative contact with a data center 323.

In accordance with a context of at least one embodiment of the invention, a flow manager 325 is provided to facilitate delivery scheduling for digital content. Thus, inasmuch as digital content may be accommodated at a CD 303, flow manager 325 can assist in managing delivery to CD 303. The flow manager 325 can be deployed between GGSN 315 and OSN 317 but, alternatively, may be deployed at other locations.

In any of a variety of contexts such as those contemplated herein, there are broadly contemplated herein, in accordance with at least one embodiment of the invention, methods and arrangements for managing the submissions of various delayable jobs to a server, and providing guarantees on the level of interference these jobs will cause to existing job allocations when the server uses a fair scheduler. While a variety of applications can be met in accordance with embodiments of the invention, the case of cellular base-station networks is discussed herein as an illustrative example.

Generally, in a context of at least one embodiment of the invention, conventional arrangements have found not to be robust to channel variation, and no guarantee has been present in the event of a channel varying during measurement. Further, such conventional arrangements do not provide absolute guarantees on the throughputs of on-demand flows. Embodiments of the invention thus improve upon such performance.

As such, in accordance with at least one embodiment of the invention, there are broadly contemplated herein heuristic-based methods and arrangements which help better ensure bounded interference. Absolute rate guarantees are provided for existing flows, and there is more robustness to channel variations with time. Particularly, only one probe flow per client is required, and the system is very robust to inaccuracies in probe-flow measurement. A system as broadly contemplated herein accounts for delayed flow deadlines while prioritizing delayed flows, and also adapts the interference bound to ensure better reliability in meeting deadlines. As broadly contemplated herein, a system also adapts efficiently to change in delayed flow requirements and channel requirements.

In accordance with at least one embodiment of the invention, a PF scheduler is used for cellular base-station scheduling. This ensures that on average, all flows receive equal resources in a base-station, with such resources involving a number of time-frequency slots. Rate and throughput are a function of these resources and of the channel conditions faced by a flow; for the purposes of non-restrictive illustration, it can be assumed that all flows face similar channels. Then, the PF scheduler will ensure that all flows have same rate. Accordingly, if there is introduced a delayed flow, and it receives throughput $\theta$, then every other flow in the base-station will also receive rate of at least $\theta$.

In accordance with at least one embodiment of the invention, the aforementioned property is advantageously exploited. Thus, to introduce a specific delayed flow, its achieved throughput $\theta$ is measured. This can be achieved by pumping data at the source of the flow. If $\theta$ is greater than a pre-chosen threshold rate T, this flow is switched "on" at rate $\theta$.

Generally, by way of elaboration in accordance with at least one embodiment of the invention, for each incoming poll from clients of delayable flows, the flow manager makes scheduling decisions (admit or disallow) on a per-BS basis. The scheduling decisions for a BS are governed by the degree of interference caused by the delayed flows on regular lows. Interference can be understood as the reduction in throughput observed by a regular flow when a new delayed flow is introduced. The flow manager attempts to bound the interference by disconnecting the flows during BS overloads. However, BSs often face short time-scale variations in the load due to regular flows. Hence, once disallowed, at least one embodiment allows that a flow is resumed as soon as possible whenever capacity becomes available at the BS to utilize the opportunities for content transfer.

In accordance with at least one embodiment of the invention, to minimize interference and permit opportunistic content transfer, there is introduced a parameter T, representing a threshold throughput. To observe the load at a BS, the proposed flow manager continuously keeps track of the (EWMA [exponentially weighted moving average] of) throughput $\theta$ achieved by each flow active at the BS. The flow manager uses the following simple rule to make decisions: at any instant of time, continue the content transfer if the flow is achieving a throughput of T or more; otherwise, suspend the flow by closing the HTTP session. It takes only a few seconds (e.g., on the order of 12 seconds) to observe the achievable throughput and make a scheduling decision, thus limiting any interference to a short duration before a flow is disconnected. Such scheduling decisions should be undertaken after each epoch (e.g., which may be on the order of a minute) for all the clients. Flows that are switched "off" can be provided with trickle data to ensure that they stay connected. Optionally, the scheme can be such that switched off clients are disconnected and a suspended client can poll back again probabilistically.

In accordance with at least one embodiment of the invention, it is indeed recognized that cellular BSs commonly use PF scheduling to balance aggregate system throughput against flow fairness. Generally, an approach as broadly contemplated herein can ensure that if a delayable flow is receiving a throughput of T or more, then regular flows with similar channel conditions will also receive at least T as long as they have traffic to transmit. Furthermore, since cellular access links are often what represent the bottlenecks, the flow manager can be placed anywhere in the operator's network to observe the throughputs and make the scheduling decisions.

In accordance with at least one embodiment of the invention, to choose an appropriate value for threshold T, an analysis is made of historical achieved throughputs (AT) observed at a BS. A high AT indicates that, the flow has a good channel quality and there is large available bandwidth at the BS. Hence, there is derived a cumulative distribution function (CDF) using the achievable throughput values measured over several days, and the median value is chosen as T. Thus, T is a statistical metric that is not expected to vary significantly across days. Once the system is instantiated by these measurements and the corresponding threshold, as more and more users use the Async system, the AT values measured by the flow manager shape the CDF further and tune the T value.

FIG. 4 sets forth a threshold-based interference method, in accordance with at least one embodiment of the invention. In the algorithm 429 shown, in a core portion (431), lines 4-10, achievable throughputs are measured sequentially. Since the introduction of one flow will lower the achievable throughput of the next, more important flows are scheduled first. A cost function C is used for prioritizing and ordering the flows. In a portion (433) of algorithm 429 that provides tracking between scheduling slots, in lines 11-16, channel conditions and foreground (non-delayable, demand) traffic that change with time are recognized. Thus, if channel conditions change with time or foreground traffic increases such that a delayable flow's throughput drops below T, flow is switched "off" to ensure adherence to bound. In a threshold adaptation portion (435) of algorithm 429, in lines 17-21, current flow progress is compared with respect to a flow deadline of each flow. If it appears that deadlines might not be met, the threshold T is made more aggressive while if it appears that if a deadline will be met very easily, threshold T can be relaxed somewhat; this feature can be better appreciated from FIG. 5 and its attendant description below.

Figure 5:
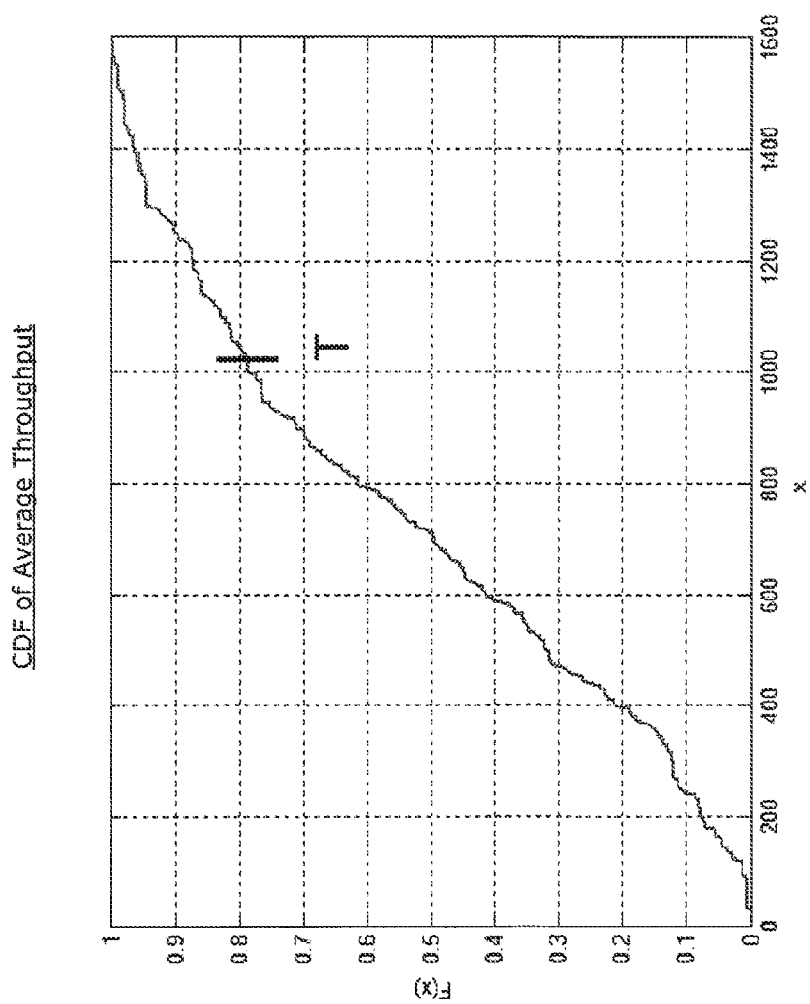
FIG. 5 graphically illustrates a manner of choosing a threshold.

As such, FIG. 5 graphically illustrates a manner of choosing a threshold, in accordance with at least one embodiment of the invention. The choice of threshold determines the level of interference to be caused to other demand flows. A CDF is used based on the history of average throughputs at each base-station, and the threshold is picked at a certain percentile of this CDF. The position of T on the CDF is an indicator of how aggressive the interference is. If the threshold is picked much above the average, one is interfering conservatively (since the delayed flow will be switched "on" only if it can manage such high rates, meaning the BS is significantly empty). If a threshold is picked much below average, one is interfering very aggressively. Based on this principle, adaptation of the threshold can be carried out via reducing the threshold if in danger of missing deadlines, while increasing the threshold if well ahead of schedule for the flow that is lagging the most; this is the rationale behind steps 16-21 in portion 433 of algorithm 429 in FIG. 4.

In accordance with at least one embodiment of the invention, FIG. 6 sets forth a refinement of a threshold-based interference method. Here, the algorithm is adapted to better exploit short-term gaps in spectrum utilization during peak load times. Thus, in the algorithm 629 shown, particularly section 637 (lines 11-21), if the achievable throughput is too low, this implies a regime where there are a lot of flows, each getting only a little bandwidth, and an introduction of additional flows will affect per-demand-flow throughput only slightly. Thus, the "if" condition in step 11 makes sure that both the regimes don't mix. The limit on number of flows to switch on in steps 11-21 is needed here, since introduction of flows will only further bring down throughput. (In steps 1-10, this was not needed, because the condition there was lower-bound on throughput, and introduction of flows will bring down throughput of successive flows.)

FIG. 7 schematically illustrates an overall system flow of a proposed flow manager, in accordance with at least one embodiment of the invention. First, all delayable flows in a system are prioritized (739), based on delivery deadline, network conditions, user classification, or other suitable factors. Next, one or two thresholds of throughput per flow are chosen (741). Based on the priority-determined order, for each flow, a probe is transmitted and throughput is measured (743). If (745) the measured throughput is greater than the first threshold, then flow is kept "on" for as long as throughput exceeds the flow-specific threshold (747). Otherwise, flow is turned "off" (749). In either instance, if a second threshold is desired to be used, if no flow had been turned "on", flow throughput is compared to the second threshold (if one is in place) (751). There is then a switching on of the R most prioritized flows whose throughput is below the second threshold (wherein R can be chosen as a function of network conditions and interference limitations).

Next, in accordance with at least one embodiment of the invention, flow thresholds for all flows are adjusted (753) based on a combination of flow progress, past throughput history of the BS in question (e.g., via consulting a CDF graph) and other network conditions (as may be deemed suitable or appropriate). New flows that have arrived into the system are then admitted (755), and a wait is made for the current epoch to end before the process restarts (739) and all flows in the system, including those newly admitted, are prioritized.

Figure 8:
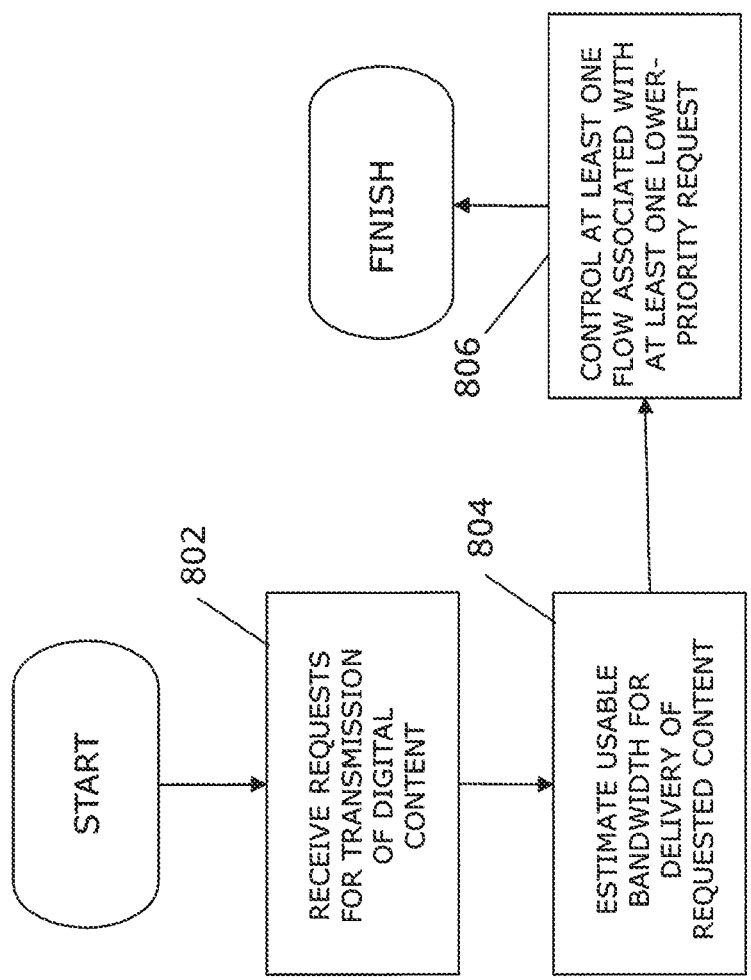
FIG. 8 sets forth a process more generally for managing variable-priority flows in a network.

FIG. 8 sets forth a process more generally for managing variable-priority flows in a network, in accordance with at least one embodiment of the invention. It should be appreciated that a process such as that broadly illustrated in FIG. 8 can be carried out on essentially any suitable computer system or set of computer systems, which may, by way of an illustrative and non-restrictive example, include a system such as that indicated at 12' in FIG. 9. In accordance with an example embodiment, most if not all of the process steps discussed with respect to FIG. 8 can be performed by way of a processing unit or units and system memory such as those indicated, respectively, at 16' and 28' in FIG. 9.

As shown in FIG. 8, in accordance with at least one embodiment of the invention, requests for transmission of digital content are received from client devices, each request being associated with a priority, the requests including at least one lower-priority delayable request and at least one higher-priority request (802). A usable bandwidth for delivery of the requested digital content through the network is estimated (804) and, within the estimated usable bandwidth, there is controlled at least one flow associated with the at least one lower-priority request in the presence of at least one flow for the at least one higher-priority request (806).

Figure 9:
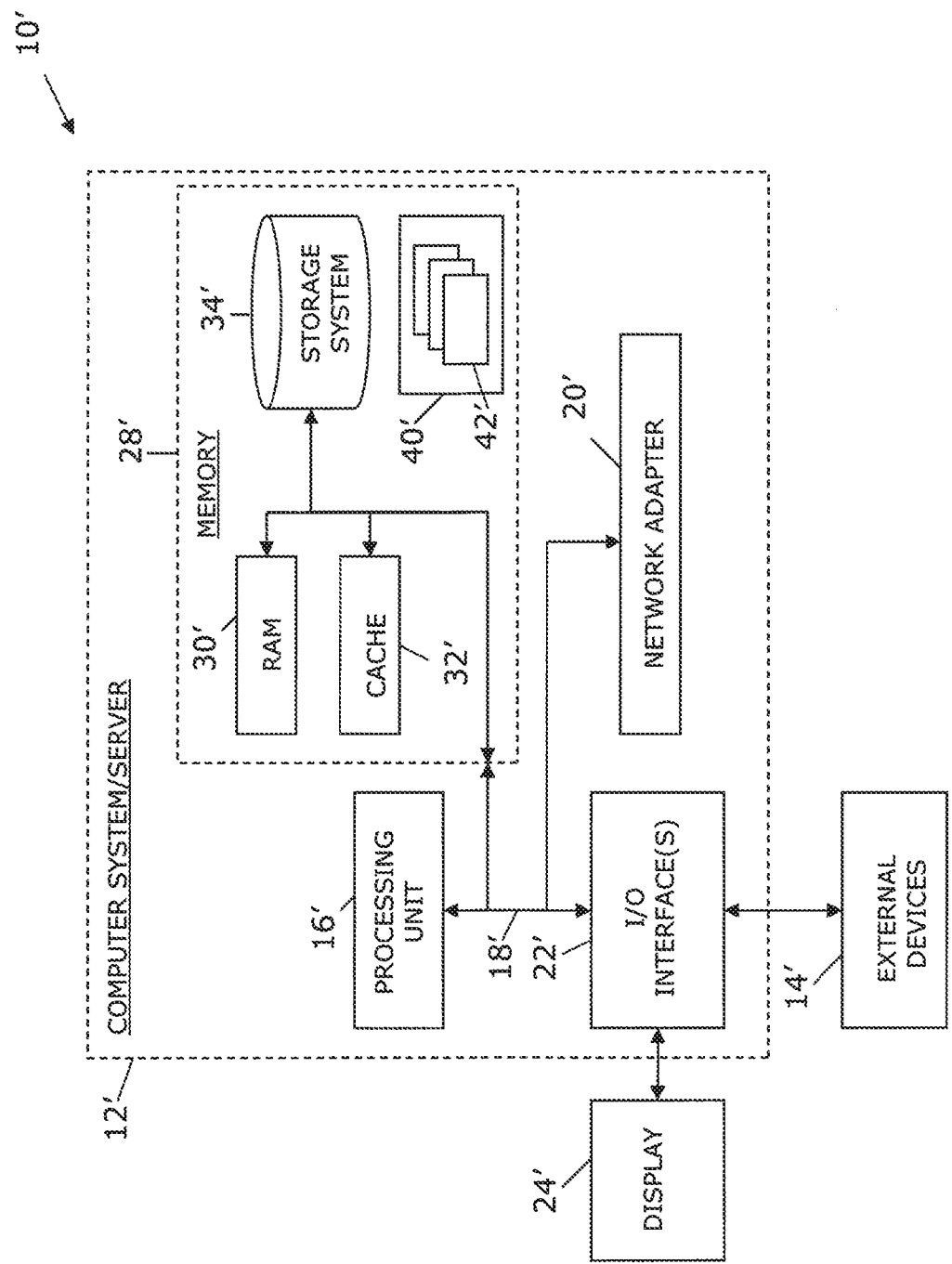
FIG. 9 illustrates a computer system.

Referring now to FIG. 9, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34° can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may inch de an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other program able data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of managing variable-priority flows in a network, said method comprising:
   utilizing at least one processor to execute computer code configured to perform the steps of:
      receiving requests for transmission of digital content from client devices, each request being associated with a priority, the requests including at least one lower-priority delayable request and at least one higher-priority request; and
      controlling at least one flow associated with the at least one lower-priority request in the presence of at least one flow for the at least one higher-priority request, said controlling comprising:
         scheduling the flow associated with the at least one lower-priority delayable request for throughput;
         monitoring a current throughput of the flow associated with the at least one lower-priority delayable request;
         comparing the monitored current throughput to a predetermined threshold;
         based on the comparison, determining that the monitored current throughput of the flow associated with the at least one lower-priority delayable request has fallen below the predetermined threshold; and
         in response to determining that the monitored current throughput of the flow associated with the at least one lower-priority delayable request has fallen below the predetermined threshold, halting throughput of the flow associated with the at least one lower-priority delayable request.

2. The method according to claim 1, wherein said controlling is governed by at least one of:
   present and historical network conditions; and
   present and historical conditions related to demand.

3. The method according to claim 1 wherein:
   said controlling comprises prioritizing at least one lower-priority flow on the basis of a cost function;
   the cost function being based on a current lag time of at least one lower-priority flow through the network with respect to at least one expected delivery time.

4. The method according to claim 1, wherein the predetermined threshold is determined based on a cumulative distribution of past throughputs in the network.

5. The method according to claim 1, comprising monitoring to ensure that throughput of at least one scheduled flow remains above the predetermined threshold between two scheduling periods.

6. The method according to claim 1, comprising adjusting the predetermined threshold based on at least one of:
   progress of at least one current flow, at least one current network condition, and at least one statistical parameter.

7. The method according to claim 6, wherein said adjusting comprises adjusting the predetermined threshold based at least on current progress of at least one delayed low-priority flow.

8. The method according to claim 6, wherein:
   said adjusting comprises adjusting the predetermined threshold based at least on the at least one statistical parameter; and
   the at least one statistical parameter is based on at least one historical distribution of flow throughputs in the network.

9. The method according to claim 1, wherein said controlling comprises scheduling at least one lower-priority flow for transmission at fair share if:
   current throughput of at least one lower-priority flow through the network is lower than a second threshold; and
   at least one other lower-priority flow has a current throughput lower than the first threshold.

10. The method according to claim 1, wherein the network comprises a cellular network.

11. The method according to claim 10, wherein said controlling comprises operating jointly with a fair scheduler of at least one base station of a cellular network.

12. The method according to claim 1, wherein said controlling comprises estimating a number of schedulable data flows during a predetermined time period.

13. An apparatus comprising:
   at least one processor; and
   a computer readable storage medium having computer readable program code embodied therewith and executable by the at least one processor, the computer readable program code comprising:
   computer readable program code configured to receive requests for transmission of digital content from client devices, each request being associated with a priority, the requests including at least one lower-priority delayable request and at least one higher-priority request; and
   computer readable program code configured to control at least one flow associated with the at least one lower-priority delayable request in the presence of at least one flow for the at least one higher-priority request;
   wherein the controlling comprises:
      scheduling the flow associated with the at least one lower-priority delayable request for throughput;
      monitoring a current throughput of the flow associated with the at least one lower-priority delayable request;
      comparing the monitored current throughput to a predetermined threshold;
      based on the comparison, determining that the monitored current throughput of the flow associated with the at least one lower-priority delayable request has fallen below the predetermined threshold; and
      in response to determining that the monitored current throughput of the flow associated with the at least one lower-priority delayable request has fallen below the predetermined threshold, halting throughput of the flow associated with the at least one lower-priority delayable request.

14. A computer program product comprising:
   a non-transitory computer readable storage medium having computer readable program code embodied therewith, the computer readable program code comprising:
   computer readable program code configured to receive requests for transmission of digital content from client devices, each request being associated with a priority, the requests including at least one lower-priority delayable request and at least one higher-priority request; and
   computer readable program code configured to control at least one flow associated with the at least one lower-priority request in the presence of at least one flow for the at least one higher-priority request;
   wherein the controlling comprises:
      scheduling the flow associated with the at least one lower-priority delayable request for throughput;
      monitoring a current throughput of the flow associated with the at least one lower-priority delayable request;
      comparing the monitored current throughput to a predetermined threshold;
      based on the comparison, determining that the monitored current throughput of the flow associated with the at least one lower-priority delayable request has fallen below the predetermined threshold; and
      in response to determining that the monitored current throughput of the flow associated with the at least one lower-priority delayable request has fallen below the predetermined threshold, halting throughput of the flow associated with the at least one lower-priority delayable request.

15. The computer program product according to claim 14, wherein the controlling of at least one flow associated with the at least one lower-priority request is governed by at least one of:
   present and historical network conditions; and
   present and historical conditions related to demand.

16. The computer program product according to claim 14, wherein the predetermined threshold is determined based on a cumulative distribution of past throughputs in the network.

17. The computer program product according to claim 14, wherein said computer readable program code is configured to adjust the predetermined threshold based on at least one of: progress of at least one current flow, at least one current network condition, and at least one statistical parameter.

18. The computer program product according to claim 14, wherein said computer readable program code is configured to schedule at least one lower-priority flow for transmission at fair share if:
   current throughput of at least one lower-priority flow through the network is lower than a second threshold; and
   at least one other lower-priority flow has a current throughput lower than the first threshold.

19. The computer program product according to claim 14, wherein the network comprises a cellular network.

20. A method comprising:
   designating at least one lower-priority delay-tolerant flow in a cellular network; and
   controlling the at least one lower-priority delay-tolerant flow to restrict an effect on throughput of at least one higher-priority flow in the cellular network;
   said controlling comprising:
      scheduling the at least one lower-priority delay-tolerant flow for transmission;
      monitoring a current throughput of the at least one lower-priority delay-tolerant flow;
      comparing the monitored current throughput of the at least one lower-priority delay-tolerant flow to a threshold, the threshold being chosen based on a cumulative distribution of historical throughputs through the cellular network;
      based on the comparison, determining that the monitored current throughput of the at least one lower-priority delay-tolerant flow has fallen below the threshold; and
      in response to determining that the monitored current throughput of the at least one lower-priority delay-tolerant flow has fallen below the threshold, halting throughput of the at least one lower-priority delay-tolerant flow.

* * * * *